(12) United States Patent
Honkanen et al.

(10) Patent No.: US 11,345,232 B2
(45) Date of Patent: May 31, 2022

(54) WHEEL HUB ARRANGEMENT FOR A DRIVING WHEEL OF A VEHICLE

(71) Applicant: VOLVO CONSTRUCTION EQUIPMENT AB, Eskilstuna (SE)

(72) Inventors: Arto Honkanen, Eskilstuna (SE); Thomas Andersson, Eskilstuna (SE); Mats Åkerblom, Eskilstuna (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 17/273,346

(22) PCT Filed: Sep. 6, 2018

(86) PCT No.: PCT/EP2018/073967
§ 371 (c)(1),
(2) Date: Mar. 4, 2021

(87) PCT Pub. No.: WO2020/048598
PCT Pub. Date: Mar. 12, 2020

(65) Prior Publication Data
US 2021/0339624 A1    Nov. 4, 2021

(51) Int. Cl.
*B60K 17/04* (2006.01)
*B60K 7/00* (2006.01)

(52) U.S. Cl.
CPC .................. *B60K 17/046* (2013.01)

(58) Field of Classification Search
CPC ........... B60K 17/046; F16H 2200/2097; F16H 57/0479
See application file for complete search history.

(56) References Cited

U.S. PATENT DOCUMENTS

| 5,813,938 A | 9/1998 | Forster |
| 8,449,424 B2 | 5/2013 | Schoon |

(Continued)

FOREIGN PATENT DOCUMENTS

| WO | WO 03/040581 A1 | 5/2003 |
| WO | WO 2005/033534 A1 | 4/2005 |

(Continued)

OTHER PUBLICATIONS

International Search Report and Written Opinion of the International Searching Authority, PCT/EP2018/073967, dated Nov. 28, 2018, 11 pages.

*Primary Examiner* — Tinh Dang
(74) *Attorney, Agent, or Firm* — Sage Patent Group (57) ABSTRACT

A wheel hub arrangement for a driving wheel of a vehicle is provided. The wheel hub arrangement is provided with a planetary gear train including: a centrally arranged sun gear wheel fixed to a drive shaft that extends in an axial direction of the wheel hub arrangement; a set of planet gear wheels distributed circumferentially around and meshing with the sun gear wheel; a ring gear wheel member extending circumferentially around the planet gear wheels and being provided with a ring gear wheel meshing with the planet gear wheels; a stationary planet wheel carrier; an annular rolling-element bearing arranged between the ring gear wheel member and the planet wheel carrier, wherein the ring gear wheel member is configured to be fixed to the driving wheel of the vehicle.

10 Claims, 5 Drawing Sheets

(56) References Cited

U.S. PATENT DOCUMENTS

| | | | |
|---|---|---|---|
| 8,727,933 B2* | 5/2014 | Enderle | ................ F16H 47/04 |
| | | | 475/331 |
| 2011/0098150 A1 | 4/2011 | Kingston | |
| 2014/0087913 A1 | 3/2014 | Reimann et al. | |
| 2017/0313180 A1 | 11/2017 | Fliearman | |

FOREIGN PATENT DOCUMENTS

| WO | WO 2007/001220 A1 | 1/2007 |
|---|---|---|
| WO | WO 2008/069707 A1 | 6/2008 |

* cited by examiner

WHEEL HUB ARRANGEMENT FOR A DRIVING WHEEL OF A VEHICLE

CROSS REFERENCE TO RELATED APPLICATIONS

This application is a 35 U.S.C. § 371 national stage application of PCT International Application No. PCT/EP2018/073967 filed on Sep. 6, 2018, the disclosure and content of which is incorporated by reference herein in its entirety.

TECHNICAL FIELD

The invention relates to a wheel hub arrangement for a driving wheel of a vehicle, wherein the wheel hub arrangement is provided with a planetary gear train.

The invention is particularly applicable in working machines within the fields of industrial construction machines or construction equipment, for instance wheel loaders. Although the invention will be described with respect to a wheel loader, the invention is not restricted to this particular machine, but may also be used in other working machines such as articulated haulers, excavators and backhoe loaders.

BACKGROUND

Hub-mounted reduction gears in the form of planetary gear trains are common for working machines, such as wheel loaders, articulated haulers, etc. Such gear trains include a centrally arranged sun gear wheel meshing with a set of planet gear wheels distributed circumferentially around the sun gear wheel and a ring gear wheel extending circumferentially around and meshing with the planet gear wheels. The sun gear wheel is driven by a drive shaft connected to a prime mover, such as an internal combustion engine or an electric motor, and a driving wheel of the working machine/vehicle is rotationally fixed to the ring gear wheel. A gear arrangement of this type also includes, for instance, a planet wheel carrier, that may be rotatable or stationary, and various roller bearings, such as between the ring gear wheel and a stationary component arranged radially inside of the ring gear wheel. US2014/0087913A1 discloses an example of a planetary transmission including a stationary planet wheel carrier.

Although hub-mounted planetary gear trains have been in use for a long time there is still a need for improvements with regard to weight, size and cost efficiency.

SUMMARY

An object of the invention is to provide a wheel hub arrangement that provides for improvements with regard to weight, size and cost efficiency. The object is achieved by an arrangement according to claim 1. In another aspect of the invention the object is achieved by a vehicle provided with such an arrangement.

The invention relates to a wheel hub arrangement for a driving wheel of a vehicle, wherein the wheel hub arrangement is provided with a planetary gear train comprising: a centrally arranged sun gear wheel fixed to a drive shaft that extends in an axial direction of the wheel hub arrangement; a set of planet gear wheels distributed circumferentially around and meshing with the sun gear wheel; a ring gear wheel member extending circumferentially around the planet gear wheels and being provided with a ring gear wheel meshing with the planet gear wheels; a stationary planet wheel carrier; and an annular rolling-element bearing arranged between the ring gear wheel member and the planet wheel carrier, wherein the ring gear wheel member is configured to be fixed to the driving wheel of the vehicle.

The wheel hub arrangement is characterized in that the planet wheel carrier is provided with an annular depression that forms at least a part of an inner bearing race for the rolling elements of the rolling-element bearing.

The inner bearing race, or at least a part thereof, is thus provided directly in the planet wheel carrier, i.e. this part of the inner bearing race is integrated in the carrier component, instead of being provided in a separate inner bearing ring that normally is used to form the inner bearing race in a rolling-element bearing assembly. Such a design has the advantage of dispensing with the need for such a separate inner bearing ring, which in turn can be used to reduce the number, cost and weight of bearing components and it also enables a simplified process for assembling the arrangement. The annular depression may form the entire inner bearing case, in which case it would have a cross-section having the shape of a half circle if spherical rolling elements (balls) are to be used, or may form only a part of the inner bearing case, for instance half of the inner bearing race, in which case the cross-section would have the shape of a quarter of a circle for similar rolling elements.

That the planet wheel carrier is "stationary" means that the planet wheel carrier is rotationally fixed/immovable in relation to the arrangement as a whole so that each planet gear wheel is allowed to rotate only around its own axis but not around the sun gear wheel.

Each gear wheel in the gear train (sun wheel, planet wheels, ring wheel) is provided with some form of teeth configured to engage/mesh with corresponding teeth of another gear wheel. Planetary gear trains are well known as such.

That one component is "fixed to" another component, such as the sun gear wheel to the drive shaft, means that the components are fixed/attached/connected to each other so as to prevent relative (rotational) motion. Such components are thus connected in a rotationally locked manner so that if one component rotates also the other rotates in the same direction (in contrast to meshing gear wheels).

In an embodiment the ring gear wheel member is provided with a corresponding depression that forms at least a part of an outer bearing race for the rolling elements of the rolling-element bearing. This way, also the need for a separate outer bearing ring can be dispensed with, which leads to a further reduction in number, cost and weight of components.

In an embodiment the wheel hub arrangement comprises an annular extension member that is axially displaced in relation to the planet wheel carrier and fixed thereto along a first circumferentially extending mating surface, wherein an edge of the mating surface extends along the inner bearing race and wherein the annular extension member is provided with a further depression that forms a remaining part of the inner bearing race so that the inner bearing race is split between the planet wheel carrier and the annular extension member. This way the two parts (i.e. the planet wheel carrier and the annular extension member) can be hold separated axially during assembly of the wheel hub arrangement so as to allow the rolling elements to be properly positioned in the bearing before bringing the two parts together and forming the inner bearing race. Preferably, the edge of the first mating surface extends in the middle of the inner bearing race. Each of the two axially displaced parts will thus provide half of the inner bearing race.

As an alternative to splitting the inner bearing race, the outer bearing race may be split instead, i.e. an annular extension member may instead be fixed to the ring gear wheel member along the outer bearing race/the corresponding depression. However, splitting of the ring gear wheel member (the outer bearing race) is likely to require more space radially than splitting of the planet wheel carrier (the inner bearing race). In principal, splitting of both inner and outer components/bearing races is possible.

In an embodiment the ring gear wheel member comprises a ring wheel part and a bearing part that are axially displaced and fixed to each other along a second circumferentially extending mating surface, wherein the ring gear wheel is arranged on the ring wheel part and wherein the depression forming the outer bearing race is arranged in the bearing part. This provides for the possibility to use different material in the wheel part and the bearing part of the ring gear wheel member and thus to adapt the material to the particular function of the gear wheel and bearing parts. In turn this provides for the possibility to improve the function of the individual parts (e.g. a first material may be more suitable for forming teeth in the ring gear wheel and another material may be more suitable for forming a bearing race) and/or to reduce costs or weight (e.g. a first heavier and more costly material may be preferred for one part but a second lighter and cheaper material may be sufficient for the other part).

In an embodiment the planet wheel carrier is provided with a set of axially protruding supports for holding the planet gear wheels.

In an embodiment the planet wheel carrier is provided with a substantially flat annular surface facing in an axial direction away from the planet gear wheels. Preferably, a backside of each of the axially protruding supports for holding the planet gear wheels forms part of this substantially flat annular surface.

In an embodiment the arrangement is provided with a brake device comprising a set of brake disks and a brake piston arranged to press the brake disks together towards a brake support surface, wherein the flat annular surface of the planet gear wheel carrier forms the brake support surface. The planet wheel carrier thus provides three functions, it carries/provides support for the planet gear wheels, it provides at least a part of the inner bearing race for the rolling elements of the rolling-element bearing, and it provides the brake support surface. This can all be provided in one integral part, which reduces the total number of components.

According to another aspect of the invention the object is achieved by a vehicle comprising at least one driving wheel, wherein the driving wheel is provided with a wheel hub arrangement of the above type.

In an embodiment the vehicle is a working machine, such as a wheel loader or an articulated hauler.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
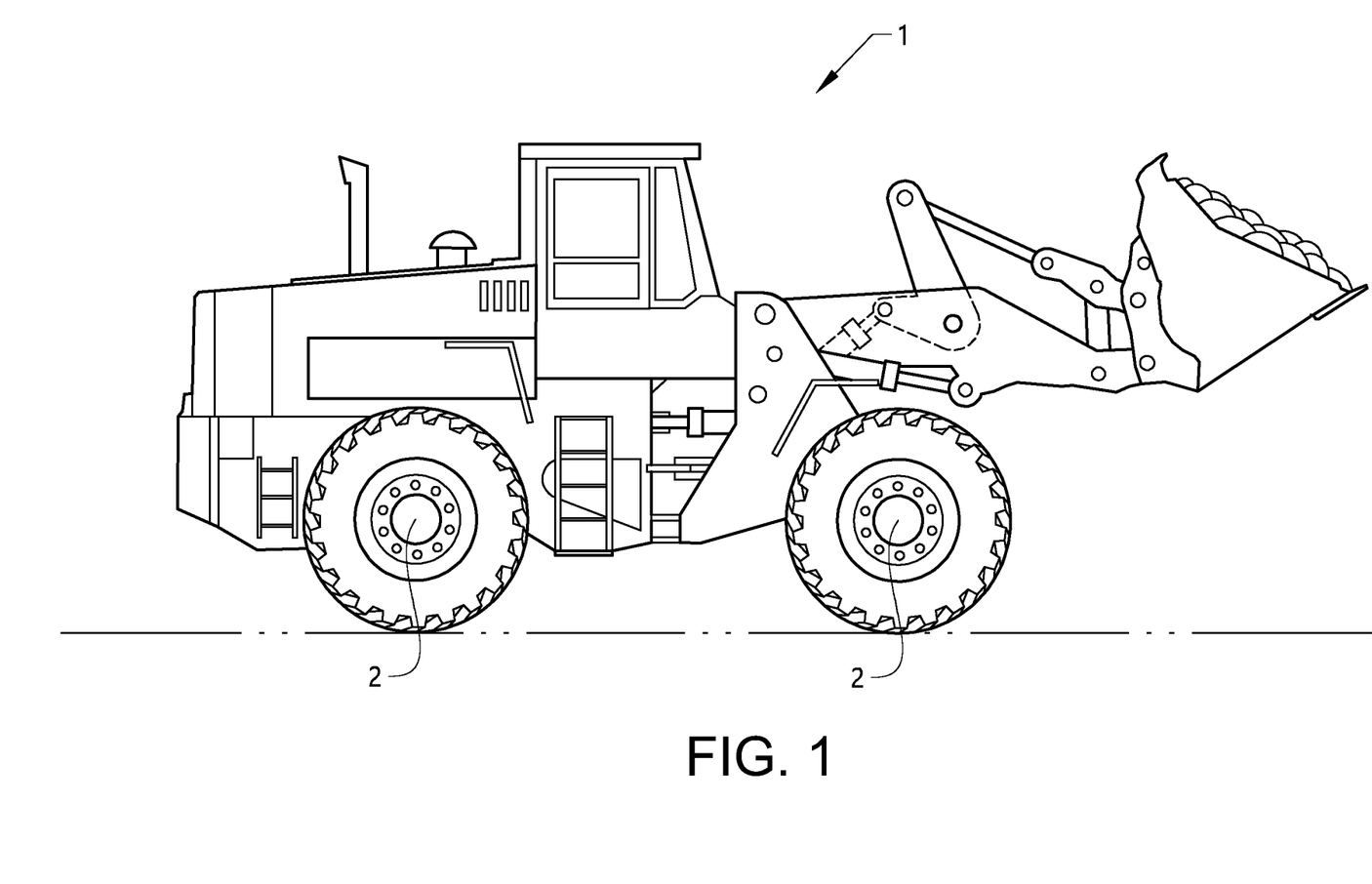
FIG. 1 is a side view of a vehicle provided with a wheel hub arrangement according to the invention.
Figure 2:
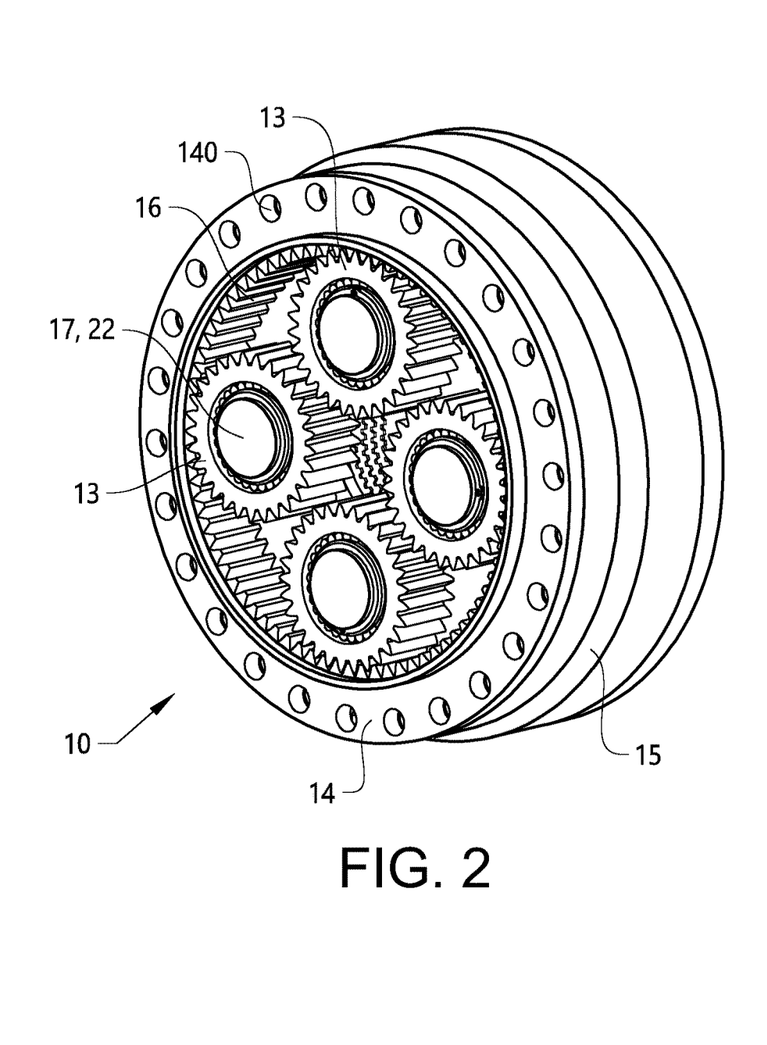
FIG. 2 is a perspective view of an outer side of an embodiment of a wheel hub arrangement according to the invention.

Figure shows a side view of a vehicle 1 in the form of a wheel loader having a driving wheel 2 provided with a wheel hub arrangement according to the invention. The vehicle 1 is provided with at least one prime mover (not shown) arranged to drive the driving wheel 2 via the wheel hub arrangement. The prime mover may be an internal combustion engine or an electric motor.

FIGS. 2-7 show different views of an embodiment of a wheel hub arrangement 10 according to the invention.

As shown in FIGS. 2-7 the wheel hub arrangement 10 is provided with a planetary gear train comprising: a centrally arranged sun gear wheel 11 rotationally fixed to a drive shaft 12 that extends in an axial direction of the wheel hub arrangement 10. The sun gear wheel 11 and the drive shaft 12 are not shown in FIGS. 2-3, and in the other figures the sun gear wheel 11 and the drive shaft 12 are only schematically illustrated. The drive shaft 12 is operatively connected to a prime mover of a vehicle, such as the vehicle 1 shown in FIG. 1.

Figure 4:
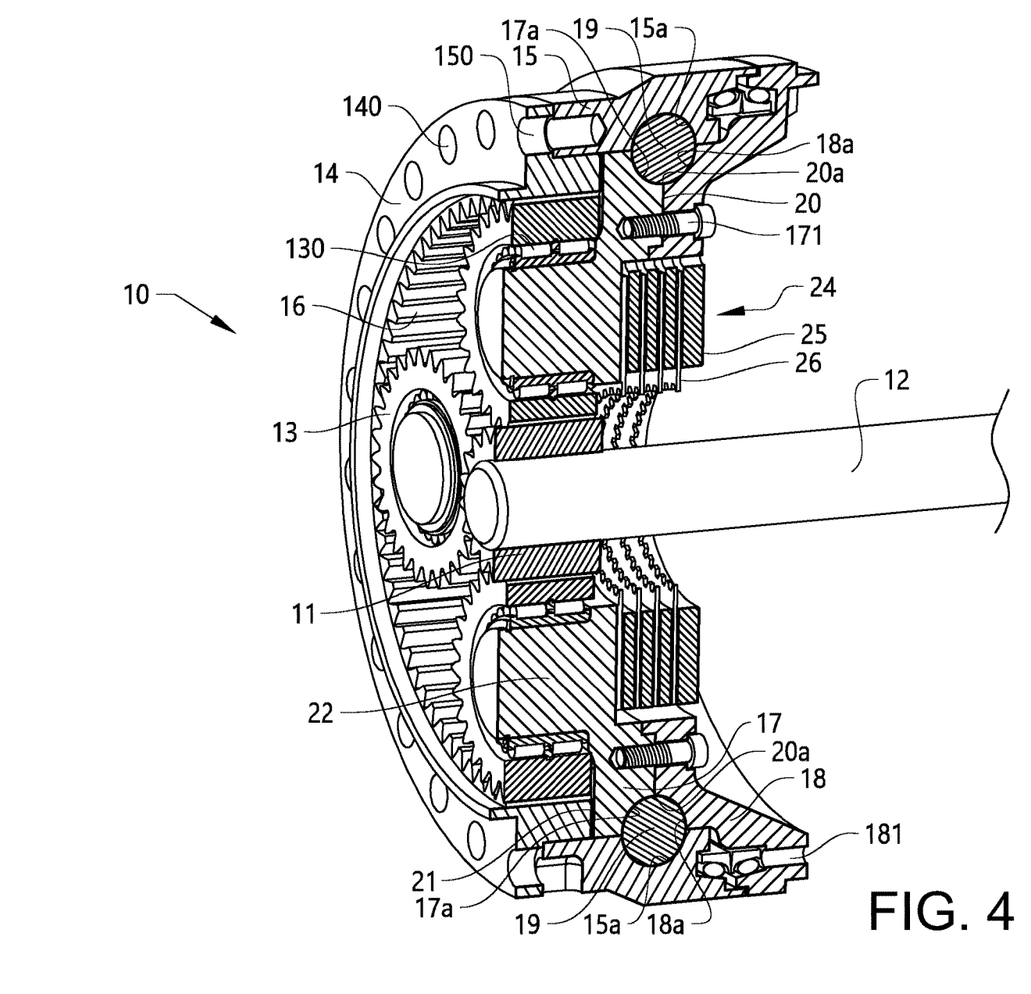
FIG. 4 is a sectional perspective view of the embodiment of FIG. 2.
Figure 5:
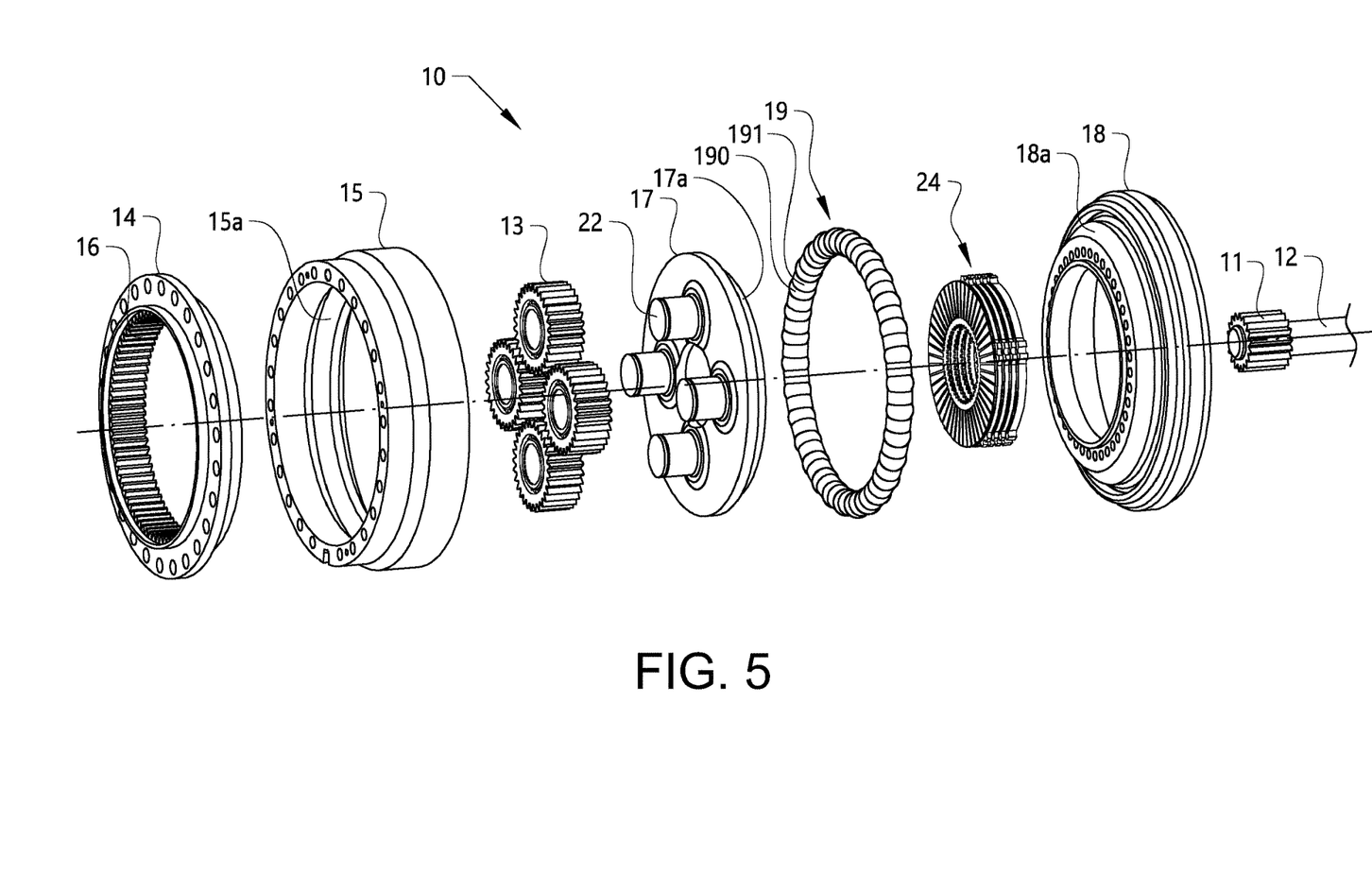
FIG. 5 is an exploded view of the embodiment of FIG. 2.
Figure 6:
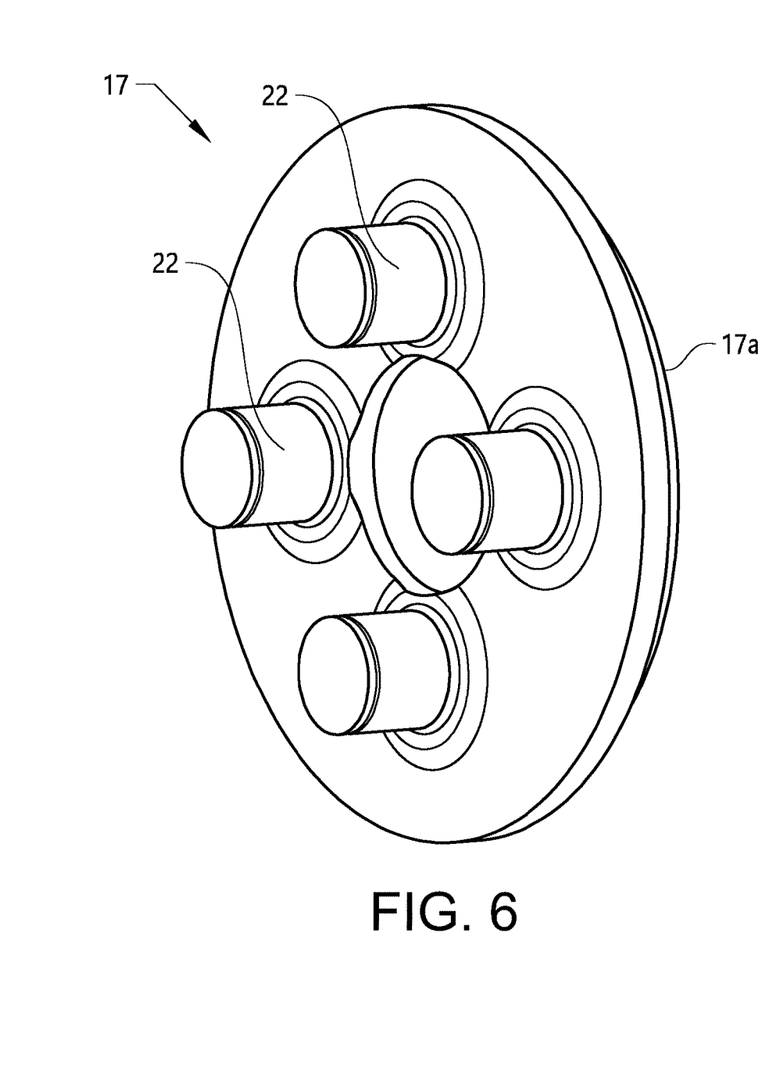
FIG. 6 is a perspective view one of the parts of the embodiment of FIG. 2.

A set of planet gear wheels 13, in this case four, is distributed circumferentially around and meshing with the sun gear wheel 11 (see FIG. 4). A ring gear wheel member, which in this case is made up of a ring wheel part 14 and a bearing part 15, extends circumferentially around the four planet gear wheels 13. The ring wheel part 14 is provided with a ring gear wheel 16 meshing with the planet gear wheels 13.

A stationary (i.e. rotationally fixed/immovable) planet wheel carrier 17 is arranged to hold the planet gear wheels 13 by means of a corresponding set of axially protruding supports 22. A planet gear wheel bearing 130 is arranged at each support 22 (see FIG. 4). The planet wheel carrier 17 is fixed to an annular extension member 18 that is axially displaced in relation to the planet wheel carrier 17. The planet wheel carrier 17 and the annular extension member 18 are fixed to each other along a first circumferentially extending mating surface 20 (see e.g. FIG. 7).

Each gear wheel in the gear train (sun wheel 11, planet wheels 13, ring wheel 16) is in this case provided with regular gear teeth configured to engage/mesh with corresponding teeth of another gear wheel. In the case of the ring gear wheel 16 the teeth are directed radially inwards.

The ring gear wheel member, or rather the ring wheel part 14 thereof, is configured to be fixed to the driving wheel 2 of the vehicle 1. Thereby, a rotational movement can be transmitted from the drive shaft 12 to the driving wheel 2 via the sun gear wheel 11, the planet gear wheels 13 and the ring gear wheel 16. The driving wheel 2 is arranged on the left (outer) side of the arrangement 10 with reference to the figures and may be connected directly to the ring wheel part 14 or via an intermediate part (not shown). Typically, the arrangement 10 comprises a cover (not shown) arranged at the ring wheel part 14 to cover and protect the gear wheels etc.

The wheel hub arrangement 10 further comprises an annular rolling-element bearing 19 arranged between the bearing part 15 of the ring gear wheel member and the planet wheel carrier 17. In this case the bearing is arranged in a space delimited by three components: the bearing part 15, the planet wheel carrier 17 and the annular extension member 18. The bearing 19 comprises rolling-elements in the form of balls 190 and hollow cylinders 191 placed between the balls 190 (see FIG. 5).

The planet wheel carrier 17 is provided with an annular depression 17a that forms half of an inner bearing race for the rolling elements 190 of the rolling-element bearing 19. An edge 20a of the mating surface 20 between the planet wheel carrier 17 and the annular extension member 18 extends along the middle of the inner bearing race. The annular extension member 18 is provided with a further depression 18a that forms a remaining half of the inner bearing race. Accordingly, the inner bearing race 17a, 18a is split evenly between the planet wheel carrier 17 and the annular extension member 18 (see FIG. 7).

Figure 7:
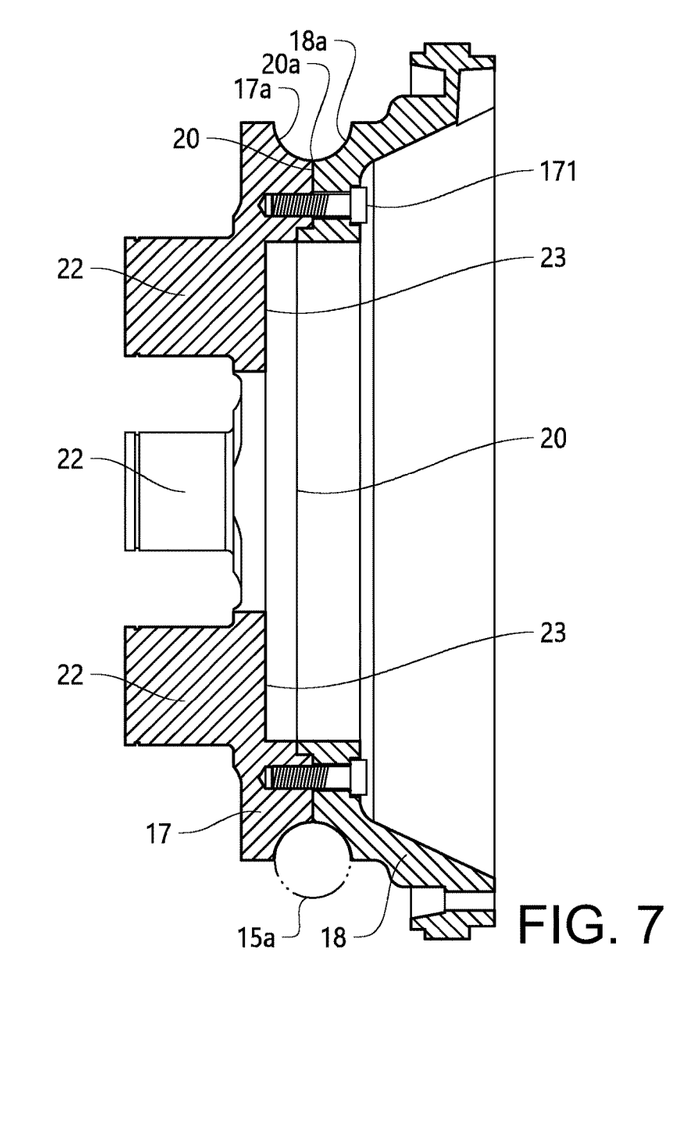
FIG. 7 is a sectional side view of two of the parts of the embodiment of FIG. 2 connected to each other.

The bearing part 15 of the ring gear wheel member is provided with a corresponding depression 15a that forms an outer bearing race for the rolling elements 190 of the rolling-element bearing 19 (see FIG. 4 and indication in FIG. 7).

Both bearing races 15a, 17a, 18a thus form in this example integrated parts of other components (bearing part 15, planet wheel carrier 17 and annular extension member 18).

When assembling the wheel hub arrangement 10 the balls 190 are positioned in the bearing 19 one at a time before bringing the planet wheel carrier 17 and the annular extension member 18 completely together axially.

The ring wheel part 14 and the bearing part 15 of the ring gear wheel member are connected to each other by means of fastening elements/bolts and corresponding holes 140, 150 (see FIG. 4). The ring wheel part 14 and the bearing part 15 are axially displaced and fixed to each other along a second circumferentially extending mating surface 21 (see FIG. 4). Since the ring gear wheel 16 is arranged on the ring wheel part 14 and the depression forming the outer bearing race 15a is arranged in the bearing part 15, the two parts 14, 15 can be made in different material adapted to the different purposes. For instance the ring wheel part 14 can be made of gear steel, such as case hardening steel, and the bearing part 15 can be made of bearing steel, such as induction hardening steel.

The mating surfaces 20, 21 may comprise several mating sub-surfaces.

Figure 3:
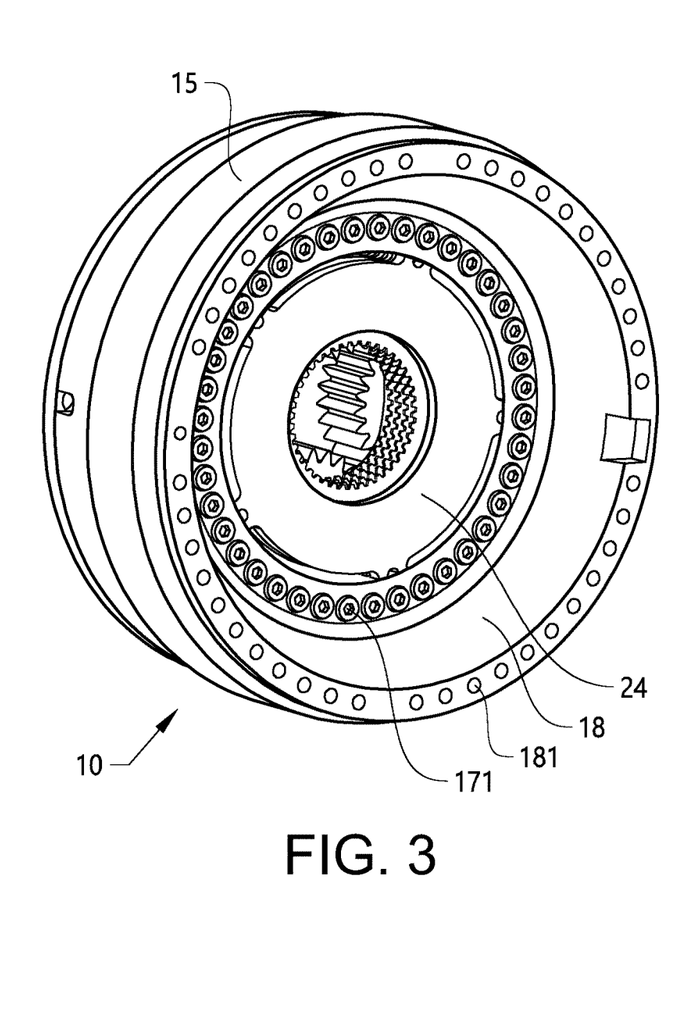
FIG. 3 is a perspective view of an inner side of the embodiment of FIG. 2.

The planet wheel carrier 17 and the annular extension member 18 are connected to each other by means of fastening elements/bolts 171 and corresponding holes in the planet wheel carrier 17 and the annular extension member 18 (see FIGS. 3, 4 and 7).

The wheel hub arrangement 10 is connectable to a support in the vehicle 1 by means of holes 181 distributed circumferentially around an outer rim of the annular extension member 18 (see FIGS. 3, 4 and 7). This holds the arrangement 10 in place and makes the planet wheel carrier 17 "stationary".

Further, the planet wheel carrier 17 is provided with a substantially flat annular surface 23 facing in an axial direction away from the planet gear wheels 13, see e.g. FIG. 7. The wheel hub arrangement 10 is further provided with a brake device comprising a set of brake disks 24 and a brake piston (not shown) arranged to press the brake disks 24 together towards a brake support surface, wherein the flat annular surface 23 of the planet wheel carrier 17 forms the brake support surface.

The set of brake disks 24 comprises stator disks 25, which are made of steel and are fixed to either of the stationary planet wheel holder 17 or the likewise stationary annular extension member 18 (by means of cut-outs at the perimeter of the stator disks 25 and pins arranged in the stationary components), and rotor disks 26, which are provided with a friction coating/lining and are fixed to the sun gear wheel 11 or the drive shaft 12 (by means of splines). The principle structure of such a set of brake disks 24 is well known and all details are therefore not shown here. For instance, the sun gear wheel 11 and the drive shaft 12 are only schematically illustrated in the figures (as mentioned above) so the connection of the rotor disks 26 to the sun gear wheel/drive shaft 11, 12 is not shown. Different variants of this connection are possible.

The principle function of the brake device, i.e. the set of brake disks 24 and the brake piston (not shown), is the following: the brake piston is moved axially towards the brake disks 24 (towards the left in FIG. 4) and presses the stator and rotor disks 25, 26 together using the flat annular surface 23 on the "backside" of the planet wheel carrier 17 as support. This reduces or prevents rotation of the sun gear wheel/drive shaft 11, 12 and thus reduces or prevents rotation of any driving wheel 2 fixed to the ring gear wheel member 14, 15. This principle function is also well known as such. The main thing in this disclosure is that the planet wheel carrier 17, or rather its flat annular surface 23 on its "backside", is used as brake support surface.

It is to be understood that the present invention is not limited to the embodiments described above and illustrated in the drawings; rather, the skilled person will recognize that many changes and modifications may be made within the scope of the appended claims.

As an example, instead of splitting the inner bearing surface 17a, 18a between two axially displaced components, a corresponding splitting can be arranged in the outer bearing surface 15a. Further, the number of planet gear wheels 13 does not necessarily have to be four, the set of brake disks 24 may arranged differently that described above, etc.

The invention claimed is:

1. A wheel hub arrangement for a driving wheel of a vehicle, wherein the wheel hub arrangement is provided with a planetary gear train comprising:
   a centrally arranged sun gear wheel fixed to a drive shaft that extends in an axial direction of the wheel hub arrangement,
   a set of planet gear wheels distributed circumferentially around and meshing with the sun gear wheel,
   a ring gear wheel member extending circumferentially around the planet gear wheels and being provided with a ring gear wheel meshing with the planet gear wheels,
   a stationary planet wheel carrier,
   an annular rolling-element bearing arranged between the ring gear wheel member and the planet wheel carrier,
   wherein the ring gear wheel member is configured to be fixed to the driving wheel of the vehicle characterized in that the planet wheel carrier is provided with an annular depression that forms at least a part of an inner bearing race for the rolling elements of the rolling-element bearing.

2. The wheel hub arrangement according to claim 1, wherein the ring gear wheel member is provided with a corresponding depression that forms at least a part of an outer bearing race for the rolling elements of the rolling-element bearing.

3. The wheel hub arrangement according to claim 1, wherein the wheel hub arrangement comprises an annular extension member that is axially displaced in relation to the planet wheel carrier and fixed thereto along a first circumferentially extending mating surface, wherein an edge of the first mating surface extends along the inner bearing race and wherein the annular extension member is provided with a further depression that forms a remaining part of the inner bearing race so that the inner bearing race is split between the planet wheel carrier and the annular extension member.

4. The wheel hub arrangement according to claim 3, wherein the edge of the first mating surface extends in the middle of the inner bearing race.

5. The wheel hub arrangement according to claim 2, wherein the ring gear wheel member comprises a ring wheel part and a bearing part that are axially displaced and fixed to each other along a second circumferentially extending mating surface, wherein the ring gear wheel is arranged on the ring wheel part and wherein the depression forming the outer bearing race is arranged in the bearing part.

6. The wheel hub arrangement according to claim 1, wherein the planet wheel carrier is provided with a set of axially protruding supports for holding the planet gear wheels.

7. The wheel hub arrangement according to claim 1, wherein the planet wheel carrier is provided with a substantially flat annular surface facing in an axial direction away from the planet gear wheels.

8. The wheel hub arrangement according to claim 7, wherein the arrangement is provided with a brake device comprising a set of brake disks arranged to be pressed together and towards a brake support surface, wherein the flat annular surface of the planet wheel carrier forms the brake support surface.

9. A vehicle comprising at least one driving wheel, wherein the driving wheel is provided with a wheel hub arrangement according to claim 1.

10. The vehicle according to claim 9, wherein the vehicle is a working machine, comprising a wheel loader or an articulated hauler.

* * * * *